United States Patent
Sanderson et al.

(10) Patent No.: US 9,452,588 B2
(45) Date of Patent: Sep. 27, 2016

(54) ADJUSTABLE SHIM

(75) Inventors: Timothy Sanderson, Bristol (GB); Peter Burchell, Winscombe (GB)

(73) Assignee: Airbus Operations Limited, Bristol (GB)

( * ) Notice: Subject to any disclaimer, the term of this patent is extended or adjusted under 35 U.S.C. 154(b) by 1419 days.

(21) Appl. No.: 12/801,826

(22) Filed: Jun. 28, 2010

(65) Prior Publication Data

US 2011/0028061 A1 Feb. 3, 2011

(30) Foreign Application Priority Data

Jul. 29, 2009 (GB) .................................. 0913171.5

(51) Int. Cl.
*B29C 43/00* (2006.01)
*B32B 5/26* (2006.01)
(Continued)

(52) U.S. Cl.
CPC ............... *B32B 5/26* (2013.01); *B29C 65/344* (2013.01); *B29C 65/3436* (2013.01); *B29C 65/3444* (2013.01); *B29C 65/364* (2013.01); *B29C 65/3636* (2013.01); *B29C 65/4815* (2013.01); *B29C 65/4835* (2013.01); *B29C 65/5014* (2013.01); *B29C 65/5021* (2013.01); *B29C 65/5057* (2013.01); *B29C 66/112* (2013.01); *B29C 66/131* (2013.01); *B29C 66/43441* (2013.01); *B29C 66/721* (2013.01); *B29C 66/72141* (2013.01); *B29C 70/24* (2013.01); *B29C 70/28* (2013.01); *B32B 5/024* (2013.01); *B32B 5/026* (2013.01); *B32B 5/08* (2013.01); *B32B 5/12* (2013.01); *B32B 5/22* (2013.01); *B32B 7/02* (2013.01); *B29C 35/02* (2013.01); *B29C 37/04* (2013.01); *B29C 65/3676* (2013.01); *B29C 66/71* (2013.01); *B29C 66/7212* (2013.01); *B29C 66/7392* (2013.01); *B29C 66/7394* (2013.01); *B29C 66/73752* (2013.01); *B29C 66/73921* (2013.01); *B29C 66/73941* (2013.01); *B29C 66/8322* (2013.01);
(Continued)

(58) Field of Classification Search
USPC ............. 156/60, 71, 148, 182, 272.2, 275.5, 156/292, 295, 307.1; 264/241, 261
See application file for complete search history.

(56) References Cited

U.S. PATENT DOCUMENTS 4,634,621 A 1/1987 Manning et al.
4,837,065 A 6/1989 Dow
(Continued)

FOREIGN PATENT DOCUMENTS

EP 0 875 452 11/1998
WO WO 2008/054409 5/2008

OTHER PUBLICATIONS

Search Report for GB 0913171.5, dated Feb. 5, 2010.

*Primary Examiner* — Andrew Piziali
(74) *Attorney, Agent, or Firm* — Nixon & Vanderhye P.C.

(57) ABSTRACT

An adjustable shim comprises a stack of plies comprising plastics material reinforced with a three-dimensional fiber layer, the plastics material being flowable under compressive force prior to cure for adjusting the thickness of the shim. The shim may be used to fill a void between two structural components joined together. Also, a method of filling a void between two structural components using the shim. The shim is easy to handle, can easily be laid up to a variety of thicknesses, and is quick to cure (depending on the plastics material used). The three-dimensional fiber layers make the shim highly compressible prior to cure, and provide significant reinforcement to the plastics material of the plies to support compressive stresses in the shim post cure.

12 Claims, 3 Drawing Sheets

(51) Int. Cl.
    *B29C 65/34*     (2006.01)
    *B29C 65/36*     (2006.01)
    *B29C 65/50*     (2006.01)
    *B29C 65/00*     (2006.01)
    *B29C 70/24*     (2006.01)
    *B29C 70/28*     (2006.01)
    *B29C 65/48*     (2006.01)
    *B32B 5/02*     (2006.01)
    *B32B 5/08*     (2006.01)
    *B32B 5/12*     (2006.01)
    *B32B 5/22*     (2006.01)
    *B32B 7/02*     (2006.01)
    *B29C 35/02*     (2006.01)
    *B29C 37/04*     (2006.01)
    *B29L 31/30*     (2006.01)

(52) U.S. Cl.
CPC . *B29L 2031/3076* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2307/50* (2013.01); *B32B 2307/58* (2013.01); *B32B 2605/18* (2013.01); *Y10T 428/249921* (2015.04); *Y10T 442/3195* (2015.04); *Y10T 442/45* (2015.04)

(56) References Cited

U.S. PATENT DOCUMENTS

| | | | |
|---|---|---|---|
| 5,580,412 A * | 12/1996 | Fantino | B29C 70/08 156/61 |
| 6,179,942 B1 * | 1/2001 | Padmanabhan | 156/153 |
| 6,429,533 B1 * | 8/2002 | Li | H01C 1/1406 257/700 |
| 6,881,374 B2 * | 4/2005 | Gerhard et al. | 264/487 |
| 7,048,985 B2 * | 5/2006 | Mack | B29C 70/24 428/105 |

* cited by examiner

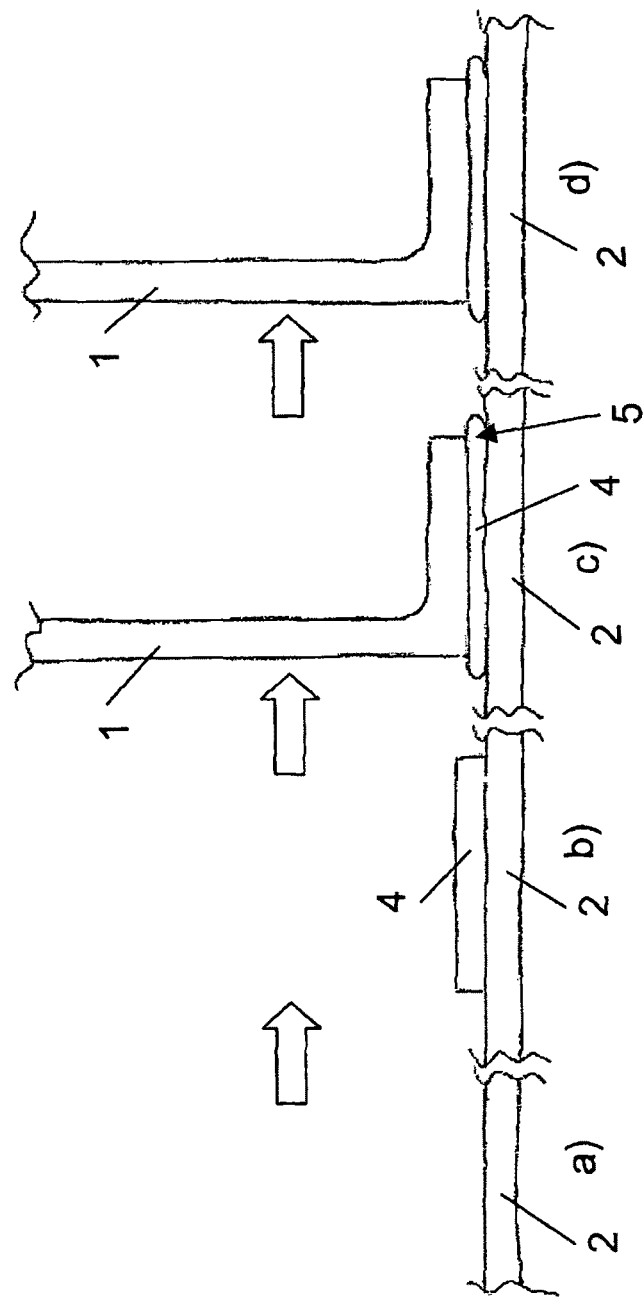

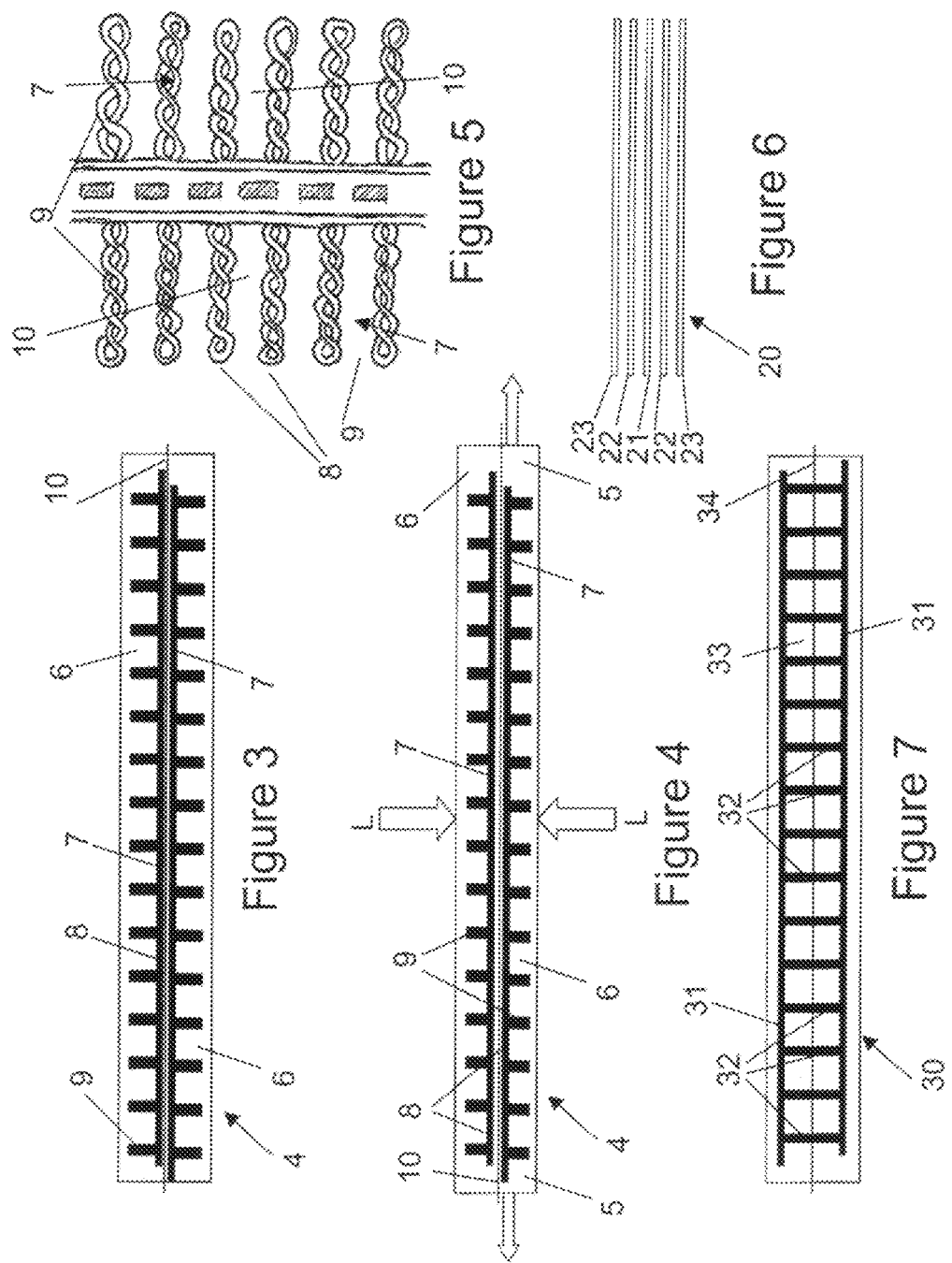

ADJUSTABLE SHIM

This application claims priority to GB 0913171.5 filed Jul. 29, 2009, the entire contents of which is hereby incorporated by reference.

FIELD OF THE INVENTION

The present invention relates to an adjustable shim for filling a void between two structural components.

BACKGROUND OF THE INVENTION

Voids between structural components have been a common problem since the start of aviation. This has consistently been caused by the manufacturing tolerances of the components in question not being sufficiently tight to allow for a good interface to be made. This situation has been made significantly worse by the introduction of composite materials where some of the manufacturing processes give downgraded tolerance performances.

Currently there are a number of ways to solve this problem. All of which are time consuming and expensive. These are:

1. Assembling the components, measuring the void and fixing packing pieces into the measured void. Any packing pieces have to be bonded or mechanically fastened in position to ensure they do not detach in service.

2. Applying a structural filler (liquid shim) to the joint during assembly, ensuring it fully covers the void with minimal air pockets. When applied the excess material that has extruded out of the sides has to be cleared up and then the shim requires a significant amount of time to harden (cure), during which time the components cannot be moved. Liquid shim can typically only be used to fill voids of less than around 1.25 mm.

3. Including within one of the components an excess of material which is fettled/filed to match the surface of the other component on assembly, again taking significant time by a skilled workforce.

4. In the case of laminate composite components, if these are found to be of insufficient dimension upon assembly to other components, additional plies can be added after the component has been cured. This then requires a re-cure of the component to incorporate the additional plies. This is costly and significantly extends the assembly time.

SUMMARY OF THE INVENTION

A first aspect of the invention provides an adjustable shim comprising a stack of plies comprising plastics material reinforced with a three-dimensional fibre layer, the plastics material being flowable under compressive force prior to cure for adjusting the thickness of the shim.

A second aspect of the invention provides an assembly comprising two structural components joined together and a shim in accordance with the first aspect filling a void between the structural components.

A third aspect of the invention provides a method of filling a void between two structural components to be joined together, the method comprising: attaching an adjustable shim to a mating surface of one of the components, wherein the adjustable shim comprises a stack of plies comprising plastics material reinforced with a three-dimensional fibre layer, the plastics material being flowable under compressive force prior to cure for adjusting the thickness of the shim; aligning the two components to a predetermined orientation so as to compress the shim and thereby adjust the shim thickness to fill a void between the two components; and curing the shim.

The present invention is advantageous in that the shim is easy to handle, can easily be laid up to a variety of thicknesses, and is quick to cure (depending on the plastics material used). The three-dimensional fibre layers provide significant reinforcement to the plastics material of the plies to support compressive stresses in the shim post cure. The shim readily fills the void between the structural components and so air pockets are easily avoided without requiring large excesses of shim material. This is primarily due to the 3-D fibre reinforcement layers which are highly adaptable. The shim can be configured to bond to one or both of the structural components during cure such that no additional bonding or fixing steps are required to prevent detachment in service. Little or no further handling of the shim or the structural components is required post cure. The shim may be provided as a sheet which can be cut to the required size. Different thickness sheets can be provided with greater or fewer fibre-reinforced plastic plies for selection depending on the size of the void to be filled. Alternatively, the shim may be constructed in situ from as many plies as necessary to achieve the required thickness, as the curing step can be used to bond the pieces together. The heating element(s) may need to be laid up between these plies. The thickness of the shim may be much greater than that capable with liquid shim.

The shim may include one or more heating elements. These may be embedded in individual composite plies or disposed between adjacent composite plies. The plastics material is either thermoplastic or thermosetting plastics material. Where the plastics material is thermoplastic, the heating elements may be energised to make the thermoplastic material flowable. The thermoplastic material will cure once the heat source is removed. Where the plastics material is thermosetting, the heating elements may be energised to cure the thermoset material. Due to the high temperatures involved, particularly with thermoplastic, it may be appropriate to provide one or more heat shields within the shim.

The fibre layers may be woven or knit. The fibre layers may have upstanding yarns to improve compressibility of the fibre layers prior to cure. In particular the fibre layers may have a towelling weave, which is particularly compressible. Alternatively, adjacent fibre layers may be woven together by their upstanding yarns. The fibre layers may include fibres of carbon, glass, or Kevlar, for example. The fibre layers may include a single fibre material, or a mixture of fibre materials woven or knit together in any suitable ratio. For example, a knit hybrid fabric with a ratio of five glass to one carbon fibres may be used.

In the assembly of the second aspect, the two structural components may be an aircraft wing box rib and a wing cover. However, the two structural components may be virtually any components in an aerospace or non-aerospace application where a void between the components needs to be filled with a structural filler.

In the method of the third aspect, the curing step may be used to bond the two structural components together to form a joint. For example, the shim may be used in a thermoplastic welding operation to join two thermoplastic structural components. Alternatively, the shim may be used to co-cure two fibre-reinforced resin composite components.

As some of the flowable plastics material will extrude from the sides of the shim under the compressive force applied, this excess material may need to be removed prior to curing the shim. Alternatively, this excess material could be cut away from the shim after cure. If only a small amount of material is extruded, it may be acceptable for this to be left in situ.

BRIEF DESCRIPTION OF THE DRAWINGS

Embodiments of the invention will now be described with reference to the accompanying drawings, in which:

FIG. 2 illustrates an alternative series of steps for joining the wing box rib to the wing cover with the adjustable shim initially attached to the cover;

FIG. 3 illustrates schematically the adjustable shim comprising two 3-D fibre reinforced plastic plies with a heating element disposed between them;

FIG. 4 illustrates schematically deformation of the shim under compressive load;

FIG. 5 illustrates in detail the 3-D fibre layers;

FIG. 6 illustrates schematically an alternative shim arrangement including heat shields; and FIG. 7 illustrates schematically an alternative shim arrangement in which adjacent fibre layers are woven together.

DETAILED DESCRIPTION OF EMBODIMENT(S)

Figure 1:
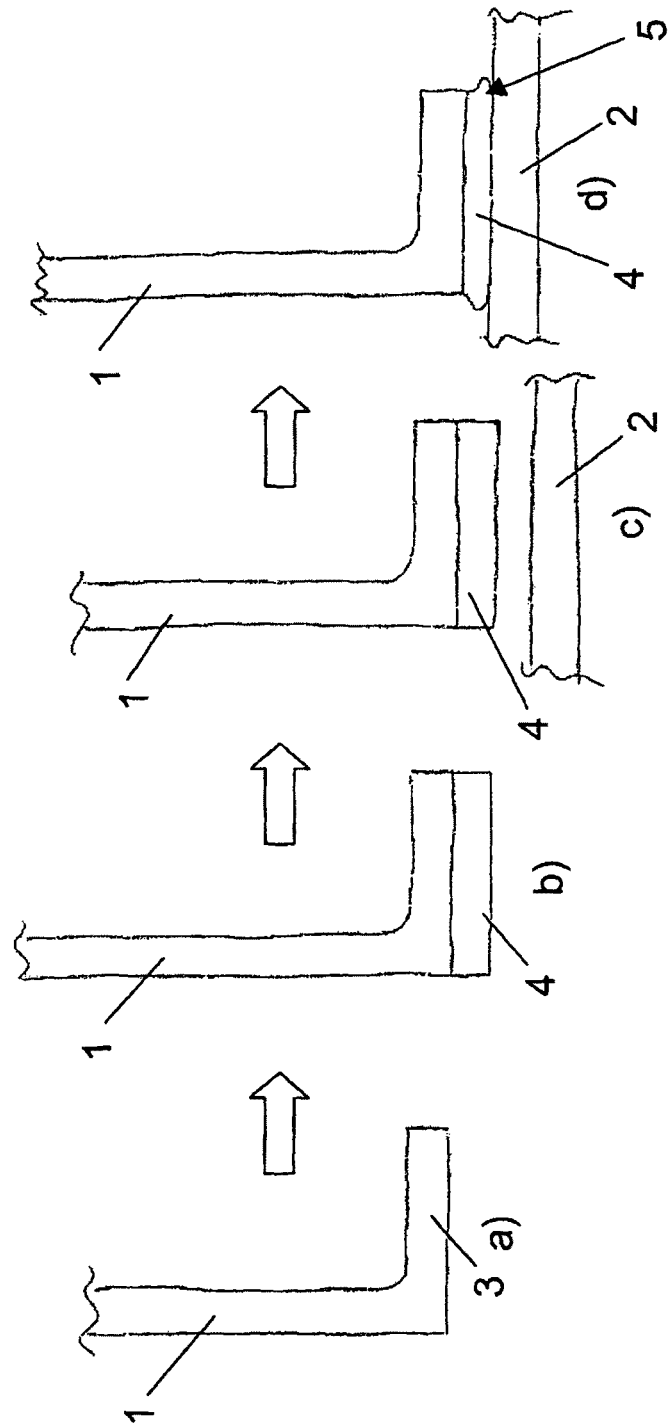
FIG. 1 illustrates the steps of joining a wing box rib to a wing cover with an adjustable shim initially attached to the rib for filling a void between the two components.

FIG. 1 shows the steps of joining a rib 1 to a lower cover 2 of an aircraft wing box. As shown in FIG. 1a), the rib 1 has a foot 3 for attaching the rib 1 to the cover 2. The rib 1 is aligned with the cover 2 (not shown in FIG. 1a)) to determine the extent of the void between the two components which is to be filled when the components are joined. An adjustable shim 4 having a thickness greater than that of the void is attached to the underside of the rib foot 3, as shown in FIG. 1b). The rib 1 and the cover 2 are brought together once again as shown in FIG. 1c), until the rib 1 and cover 2 are correctly aligned as shown in FIG. 1d). A jig (not shown) may be used to align the components, if necessary.

As can be seen from FIG. 1d), the shim 4 is compressed when the rib 1 and cover 2 are correctly aligned. Some of the shim material is extruded from the sides 5 under the compressive load. The compressive load is applied to the shim 4 by the weight of the rib 1 alone, or with additional compressive load provided manually or by a jig/tooling. The shim 4 includes a stack of plies of plastics material reinforced with a three-dimensional fibre layer. The plastics material is flowable under the compressive load to adjust the thickness of the shim 4 to closely fill the void between the rib 1 and the cover 2. Once the thickness of the shim 4 has been adjusted in this way, the shim is cured such that the plastics material is no longer flowable in normal use.

FIG. 2 shows an alternative series of steps for joining the rib 1 to the cover 2. The rib 1 and the cover 2 are initially aligned to determine the extent of the void to be filled, as before. With the cover 2 in place, as shown in FIG. 2a), a suitable thickness of shim 4 is attached to the upper surface of the cover 2, as shown in FIG. 2b). The rib 1 and the cover 2 are then brought together once again as shown in FIG. 2c), until the rib 1 and cover 2 are correctly aligned. A jig (not shown) may be used to align the components, if necessary.

As can be seen from FIG. 2c), the shim 4 is compressed when the rib 1 and cover 2 are correctly aligned. The thickness of the shim 4 is adjusted under the compressive load during alignment of the two components causing some of the shim material to be extruded from the sides 5, as before. With the rib 1 and cover 2 correctly aligned as shown in FIG. 2d), the shim 4 is cured such that the plastics material in the shim is no longer flowable in normal use.

Once the shim 4 has cured following the steps described above with reference to FIG. 1 or FIG. 2, the rib 1 and cover 2 are drilled and bolted to join them together to form the completed joint.

The shim 4 will now be described in detail with reference to FIGS. 3 to 5. As shown in FIG. 3, the shim 4 includes two plies of plastics material 6, each reinforced with a three-dimensional fibre layer 7. The fibre layers 7 include a substantially two-dimensional mat 8 with an array of fibre yarns 9 extending therefrom. The two fibre layers 7 are oriented oppositely such that the fibre yarns 9 extend away from one another, with the two-dimensional mats 8 lying back-to-back. Between the two plies is an electrical heating element 10.

The shim 4 may be constructed in situ by laying up the plies and the electrical heating element 10 as shown. A greater number of plies and heating elements may be laid up as required. Alternatively, the shim 4 may be pre-prepared. The shim and/or the individual plies may be cut from sheet material.

The plastics material 6 of the plies is a thermosetting epoxy polymer. The fibre layers 7 are woven carbon fibres. The uncured epoxy is pre-impregnated into the fibre layers as so-called "prepreg" plies supplied in "wet" form.

FIG. 4 shows the effect of applying compressive load L to the shim 4 during alignment of the rib 1 and cover 2. The wet prepreg plies reduce in thickness as the epoxy 6 is extruded out from the sides 5. The upstanding fibre yarns 9 are compressed so reduce in height. Once the thickness of the shim 4 has been adjusted to closely fill the void between the rib 1 and the cover 2, the electrical heating element 10 is energized, which heats the shim 4 to cure the epoxy 6 in situ. The supply of current to the heating element 10 is carefully controlled using a temperature control device (not shown) to ensure sufficient energy is supplied only to cure the epoxy.

The heating element 10 is an array of metallic conductive heating wires in a two-dimensional mesh. By embedding the heating element 10 in the shim 4, the heating of the shim can be localised. This is important as excessive non-localised heating could cause thermal expansion problems in the rib 1 and cover 2, leading to tolerance issues. Moreover, the rib 1 and cover 2 are each made from carbon fibre-reinforced epoxy composite similar to that of the shim 4. Although the composite rib 1 and cover 2 are each cured components prior to the assembly process described above, excessive heating of these composite components could lead to their softening and deformation, which also would give rise to tolerance issues.

A significant excess of epoxy extruded from the sides 5 of the shim will need to be removed prior to cure. However, a small amount of extrusion will normally not interfere with the joint being formed.

FIG. 5 shows the fibre layers 7 and the mesh heating element 10 in detail. The fibre layers 7 are woven as a highly compressible towelling weave. The twists of upstanding yarns 9 extend from the woven substantially two-dimensional mat 8. The upstanding yarns 9 are what makes the woven fibre layers 7 so compressible, and hence suitable for use in the adjustable shim 4. The fibre layers 7 are particularly important as they must be capable of withstanding large compressive stresses post cure. The three-dimensional fibre layers 7 provide significant reinforcement to the plastics material 6 of the plies to support these compressive stresses.

The towelling weave in particular provides good orientation of fibres in the through thickness direction of the shim 4.

Many alternatives within the scope of this invention are envisaged, some of which will be elaborated here. Others will be apparent to those skilled in the art.

The thermosetting plastics material of the prepreg plies may be selected to be curable at room temperature, which would negate the need for the electrical heating element to be embedded between the plies of the shim. Some thermosetting epoxies would be suitable, but would need to be kept cool prior to use to prevent premature curing of the shim.

The thermosetting plastics material of the prepreg plies of the shim may have a different melting temperature to that used in the composite structural components (the rib and cover, for example) to which it is applied. If heating of the shim to cure it would lead to softening of either of the structural components, then it may be necessary to provide a heat shield on one of both sides of the shim. FIG. 6 illustrates schematically the composition of a shim having heat shields. The shim 20 includes a heating element 21 disposed between a pair of three-dimensional fibre-reinforced thermosetting plastic plies 22. Attached to the outer surfaces of each of the plies 22 is a heat shield 23. The heating element 21 and the plies 22 may be similar to those of the shim 4. The heat shields 23 may comprise ceramic, metal or thermoplastic material, for example. The heat shields 23 protect the composite structural components either side of the shim 20 from heat deformation when the heating element 21 is energized to cure the plies 22.

Where heat shields are used, it may be necessary to provide an "interfay" sealant and/or structural attachment between the shim and the composite structures. The interfay sealant is provided between the mating surfaces of the shim and the structural component to prevent moisture ingress and resulting material degradation which would otherwise occur. The structural attachment retains the shim in place. In some circumstances it may be beneficial to omit the heat shields 23 such that the shim is co-cured to the structural components to form a mechanical bond between the shim and at least one of the structural components to retain the shim in place.

Where a heat source is required to cure the thermosetting plastics material at elevated temperatures, this may be achieved by other means than resistance heating. For example, the conductive metallic mesh previously described may be heated using an induction technique. Both the resistance heating and induction heating techniques provide localised heating, which can be advantageous where the structural components are susceptible to heat deformation. Where this is not an issue, for example, where the melting temperature of the structural components is significantly higher than that required to cure the thermoplastic shim material, then other techniques become available. These include, but are not limited to, heat lamps, ultrasonic heating, and ovens.

The reinforcing fibres in the plies of the shim could be made of other materials than carbon. For example, the fibres could be of glass. A glass/epoxy composite ply would exhibit good electrical insulation properties. The fibre layers could be woven from a mixture of carbon and glass fibres. For example, a ratio of five glass to one carbon fibres could be used to provide a hybrid woven fabric.

As an alternative to a woven fibre layer, the reinforcing fibres may be knitted. A knitted layer would also provide good compressible properties and a three-dimensional structure. An alternative woven ply for the adjustable shim is shown in FIG. 7. The ply 30 includes a pair of woven two-dimensional layers 31 woven together by upstanding fibre yarns 32. The ply 30 is pre-impregnated with a thermosetting plastic 33, such as epoxy. A heating element 34 similar to the heating element 10 is embedded in the ply 30 for curing the plastic 33, although this is optional. The ply 30 is highly compressible due to the compressibility of the upstanding fibre yarns 32.

Instead of thermosetting plastics, the plies of the shim may include thermoplastic reinforced with a three-dimensional fibre layer. Thermoplastics can offer many advantages over thermosetting plastics. For example, a fibre-reinforced thermoplastic shim could be used in a thermoplastic welding operation to join the shim to the composite structural components. Thermoplastic shim would provide improved through thickness compressible strength compared with the thermosetting shim described above. Suitable thermoplastics are polyamide, PEEK and PEI, for example. The thermoplastic material could be used to replace the thermosetting plastic in any of the examples described here.

Whereas heat is used to cure the thermosetting plastic in the shims described above, heat would need to be used to make the thermoplastic in the shim flowable prior to cure. In other words, the heat would need to be applied to the shim as the structural components are brought into alignment such that the thickness of the shim becomes adjustable. Once the structural components are aligned, the heat can be removed allowing the thermoplastic to cool and cure at the desired thickness.

The melting temperature of most suitable thermoplastics is around 400 degrees Celsius, some 200 degrees higher than that of the equivalent thermosetting plastics. Heat shields such as those described previously will therefore need to be used with the thermoplastic shim, unless a thermoplastic welding operation is desirable to join the shim to one or both of the structural components. Heat may applied using any of the induction, ultrasonic, or resistance heating methods described above to provide localised heating of the thermoplastic plies.

In the above embodiments, the structural components are of composite but these may be of more traditional metallic construction, such as Aluminium. As Aluminium tends to soften at around 200 degrees Celsius, the shim may need to be heat shielded to prevent heat deformation of the Aluminium structural components. Furthermore, most Aluminium alloys are carefully heat treated to control their material properties. By raising their temperature to even below their softening temperature may result in a degradation of these material properties. Accordingly heat shielding of the shim may be required to protect the Aluminium structural components at temperatures well below 200 degrees Celsius.

Although the invention has been described above with reference to one or more preferred embodiments, it will be appreciated that various changes or modifications may be made without departing from the scope of the invention as defined in the appended claims.

The invention claimed is:

1. A method of filling a void between two structural components each component having at least a partial mating surface, said void existing when said mating surfaces are joined together in a predetermined orientation, the method comprising:

attaching an adjustable shim to said mating surface of one of the components, wherein the adjustable shim comprises a stack of plies comprising plastic material reinforced with a three-dimensional fibre layer, the plastic material flowable under compressive force prior to cure for adjusting the thickness of the shim;

after attaching said shim, aligning the two components to said predetermined orientation to compress the shim and fill said void between the two components; and curing the shim with said components in said predetermined orientation.

2. A method according to claim 1, wherein the plastic material is one of a thermoplastic material and a thermosetting plastic material.

3. A method according to claim 1, wherein the curing step bonds the two structural components together to form a joint.

4. A method according to claim 1, further comprising removing excess plastics material extruded from the shim when compressed.

5. A method according to claim 1, wherein the three-dimensional fibre layers are compressed when the shim is compressed.

6. A method according to claim 1, wherein the shim includes one or more heating elements and said plastic material is a thermosetting plastic material, and the method further comprises the steps of energising the heating elements to cure the thermosetting plastic.

7. A method of filling a void between first and second structural components to be joined together, the method comprising:

aligning said structural components to a predetermined orientation and determining the extent of said void;

locating an adjustable shim in the void, said adjustable shim comprising a stack of plies with at least one ply comprising a curable plastics material reinforced with a three-dimensional fibre layer, said plastics material flowable under compressive force prior to cure for adjusting the thickness of the shim;

re-aligning the two components to said predetermined orientation thereby compressing said shim to fill said void; and curing the shim.

8. A method according to claim 7, wherein the plastics material is one of a thermoplastic material and a thermosetting plastic material.

9. A method according to claim 7, wherein the plastics material is a thermosetting plastic material and includes at least one heating element, and the method further comprises the step of energising the heating element to cure the thermoset material.

10. A method according to claim 7, wherein the curing step bonds the two structural components together to form a joint.

11. A method according to claim 7, further comprising removing excess plastic material extruded from the shim when compressed.

12. A method according to claim 7, wherein the three-dimensional fibre layer are compressed when the shim is compressed.

* * * * *